US008204051B2

United States Patent
Sreejith et al.

(10) Patent No.: US 8,204,051 B2
(45) Date of Patent: Jun. 19, 2012

(54) APPARATUS AND METHOD FOR QUEUING DELAY-SENSITIVE PACKETS FOR TRANSMISSION ON HETEROGENOUS LINKS

(75) Inventors: Sreedharan Sreejith, Murphy, TX (US); Pradeep Samudra, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1202 days.

(21) Appl. No.: 10/392,216

(22) Filed: Mar. 19, 2003

(65) Prior Publication Data

US 2004/0184449 A1 Sep. 23, 2004

(51) Int. Cl.
*H04L 12/28* (2006.01)

(52) U.S. Cl. .......................... 370/389; 370/394

(58) Field of Classification Search .................. 370/235, 370/238, 395.1, 396, 412, 417, 418, 389, 370/394

See application file for complete search history.

(56) References Cited

U.S. PATENT DOCUMENTS

| | | | | |
|---|---|---|---|---|
| 4,769,815 A * | 9/1988 | Hinch et al. | .................. | 370/236 |
| 5,400,324 A * | 3/1995 | Eriksson et al. | ............. | 370/394 |
| 5,878,032 A * | 3/1999 | Mirek et al. | .................. | 370/252 |
| 6,178,448 B1 * | 1/2001 | Gray et al. | ..................... | 709/224 |
| 6,449,265 B1 * | 9/2002 | Prieto, Jr. | ..................... | 370/329 |
| 6,463,280 B1 * | 10/2002 | Takahashi et al. | ............ | 455/428 |
| 6,597,669 B1 * | 7/2003 | Takahashi et al. | ............ | 370/325 |
| 6,621,801 B1 * | 9/2003 | Wright et al. | ................ | 370/319 |
| 6,625,131 B1 * | 9/2003 | Yee-Madera et al. | ........ | 370/325 |
| 6,657,954 B1 * | 12/2003 | Bird et al. | ..................... | 370/229 |
| 6,772,375 B1 * | 8/2004 | Banga | ............................ | 714/47 |
| 6,862,618 B1 * | 3/2005 | Gray et al. | ..................... | 709/224 |
| 6,961,349 B2 * | 11/2005 | Malomsoky et al. | ........ | 370/469 |
| 6,970,420 B1 * | 11/2005 | Kalkunte et al. | ............. | 370/230 |
| 7,002,918 B1 * | 2/2006 | Prieto et al. | .................... | 370/252 |
| 2002/0118640 A1 * | 8/2002 | Oberman et al. | ............ | 370/230 |

* cited by examiner

*Primary Examiner* — Dang Ton
*Assistant Examiner* — Brian O Connor

(57) ABSTRACT

An apparatus for use in a first packet switching device that transmits outgoing data packets to a second packet switching device over N heterogeneous data links. The first packet switching device comprises N packet queues for storing outgoing data packets. The apparatus selects one of the N heterogeneous data links to transmit a first outgoing data packet. The apparatus comprises a controller that calculates a packet delay value for each one of a subset of S of the N heterogeneous data links. The packet delay (PD) value for each data link is determined as a function of i) a propagation delay (D) of the data link; ii) a packet size (PS) of the first outgoing data packet; iii) a queue size (QS) of a packet queue associated with the data link; and iv) a bandwidth (BW) of the data link.

20 Claims, 3 Drawing Sheets

APPARATUS AND METHOD FOR QUEUING DELAY-SENSITIVE PACKETS FOR TRANSMISSION ON HETEROGENOUS LINKS

TECHNICAL FIELD OF THE INVENTION

The present invention is generally directed to packet data switching devices and, in particular, to a packet queuing apparatus that optimizes end-to-end packet delivery delays across a plurality of heterogeneous links connecting two nodes.

BACKGROUND OF THE INVENTION

Packet switching devices transmit data in packets through a data network. In some protocols, data is transmitted in fixed-sized packets called cells. Each block of end-user data being transmitted is divided into cell payloads. A unique identifier, a sequence number and a destination address are attached to each cell payload to form the entire cell. The cells are independent and may traverse the data network by different routes. As a result, the transmitted cells may incur different levels of propagation delay (or latency) caused by physical paths of different lengths. The cells also may be held for varying amounts of delay time in buffers in intermediate switches in the network. Furthermore, the cells also may be switched through different numbers of packet switches as the cells traverse the network, and the switches may have unequal processing delays caused by error detection and correction.

In many packet data networks, two switching device (or switching nodes) may be coupled by more than one data link. This is done to increase bandwidth and to provide redundancy, among other reasons. As a result, a packet scheduler in a source node (or transmitting node) may transmit data packets to a destination node (or receiving node) over two or more data links. In such a multilink environment, the packet scheduler may select different links for different data packets in order to maximize throughput. The link for each data packet may be selected by any one of a number of well-known scheduling algorithms. Since the total delay on each link may be different, some data packets may arrive out of order in the destination node, thereby requiring some packet reordering at the destination. The packet reordering can significantly reduce the effective throughput (good put) of many end-user applications, particularly TCP-based applications.

However, multilink scheduling algorithms typically assume that a source node and a destination node are coupled by a plurality of homogeneous point-to-point links having equal bandwidth and equal propagation delay properties. Under this assumption, it is relatively easy to select an optimal link for sending the next data packet from the source node to the destination node without causing severe packet reordering.

However, these scheduling algorithms cannot be extended to network architectures in which packet switching devices may be coupled by a plurality of heterogeneous links having different bandwidths and different propagation delay properties. In fact, a typical bandwidth-based load-balancing algorithm used for homogenous multilinks may cause severe packet reordering, delay and jitter at the destination node when used in a network architecture using heterogeneous multilinks. The problem becomes severe when dealing with variable size packets, rather than fixed-size cells.

Therefore, there is a need in the art for improved apparatuses and methods for transmitting data packets over heterogeneous multilinks connecting nodes in a data network. In particular, there is a need for an improved packet scheduler that can select among heterogeneous multilinks in order to optimize the end-to-end delays of packet delivery and minimize the reordering or received data packets.

SUMMARY OF THE INVENTION

The present invention provides a new packet scheduler and packet-scheduling algorithm for load balancing in multilink network architectures. The present invention optimizes the end-to-end delay of packet delivery in order to minimize packet reordering. The new scheme avoids the need for large packet buffers in the destination node that are used to perform packet reordering.

To address the above-discussed deficiencies of the prior art, it is a primary object of the present invention to provide an apparatus for selecting one of N heterogeneous data links for transmitting a first outgoing data packet for use in a first packet switching device capable of transmitting outgoing data packets to a second packet switching device over the N heterogeneous data links. The first packet switching device comprises N packet queues for storing outgoing data packets prior to transmission over the N heterogeneous data links. According to an advantageous embodiment of the present invention, the apparatus comprises a controller for selecting one of the N heterogeneous data links to transmit the first outgoing data packet. The controller calculates a packet delay value for each one of a subset of S of the N heterogeneous data links, wherein the packet delay (PD) value for the each of the S heterogeneous data links is determined as a function of i) a propagation delay (D) of the each heterogeneous data link; ii) a packet size (PS) of the first outgoing data packet; iii) a current queue size (QS) of a packet queue associated with the each heterogeneous data link; and iv) a bandwidth (BW) of the each heterogeneous data link.

According to one embodiment of the present invention, the packet delay value for the each of the S heterogeneous data links is given by the equation:

$$PD = D + (PS + QS)/BW.$$

According to another embodiment of the present invention, the controller selects one of the S heterogeneous data links having a minimum packet delay value to transmit the first outgoing data packet.

According to still another embodiment of the present invention, the apparatus further comprises a queue statistics monitor for monitoring queue sizes (e.g., real time) of the N packet queues.

According to yet another embodiment of the present invention, the controller adds the first outgoing data packet to a corresponding one of the packet queues associated with the selected data link having the minimum packet delay value.

According to a further embodiment of the present invention, the queue statistics monitor updates the queue sizes of the N packet queues after the controller adds the first outgoing data packet to the corresponding one of the packet queues associated with the selected data link.

According to a still further embodiment of the present invention, the queue statistics monitor updates the queue sizes before the controller calculates new packet delay values associated with a transmission of a second outgoing data packet following the first outgoing data packet.

According to a yet further embodiment of the present invention, the controller is capable of determining a quality of service (QoS) requirement associated with the first outgoing data packet.

In one embodiment of the present invention, the controller is capable of determining the subset of S heterogeneous data links from the QoS requirement associated with the first outgoing data packet.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
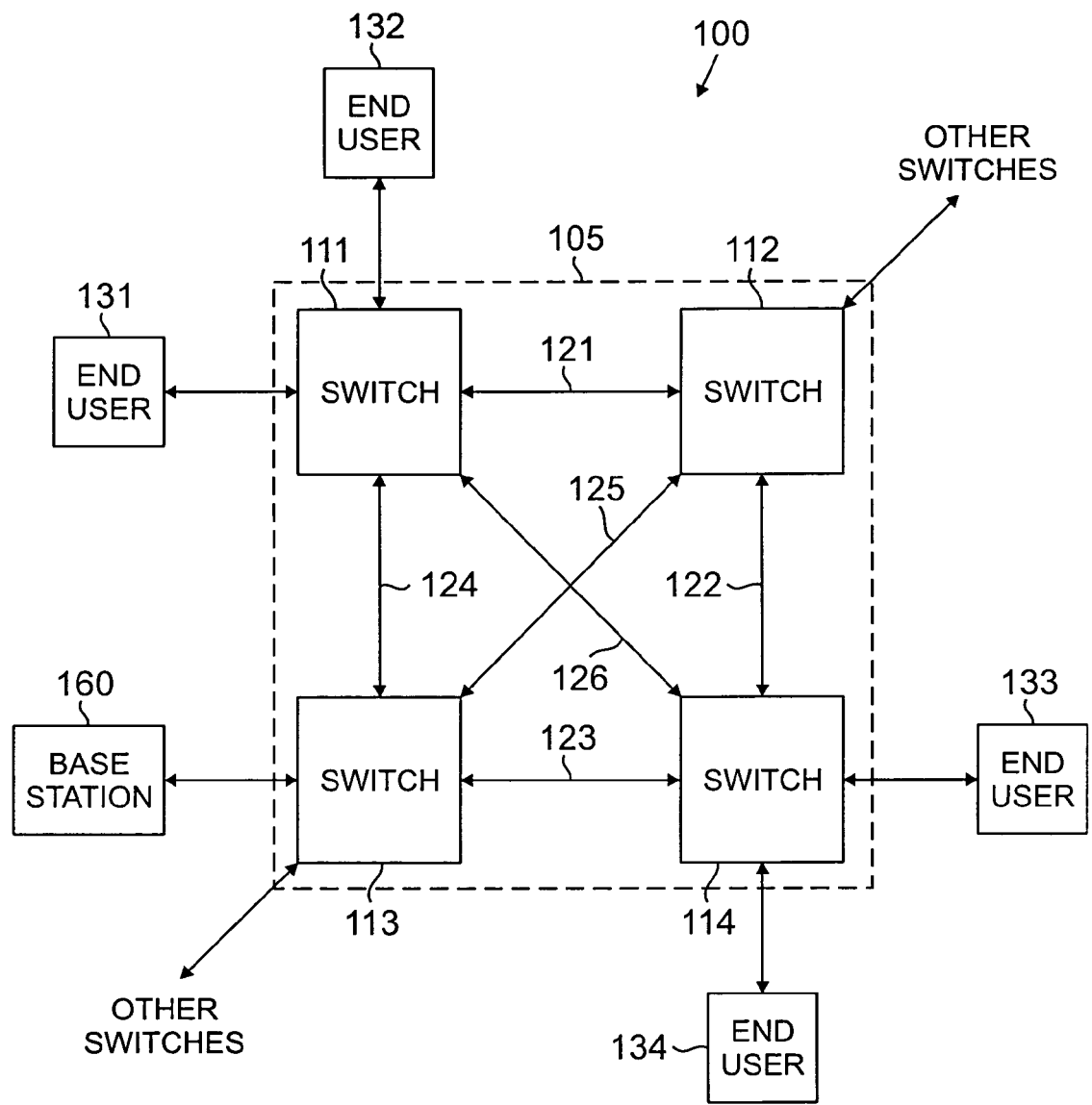
FIG. 1 illustrates an exemplary communication network containing data packet switches according to one embodiment of the present invention.
Figure 2:
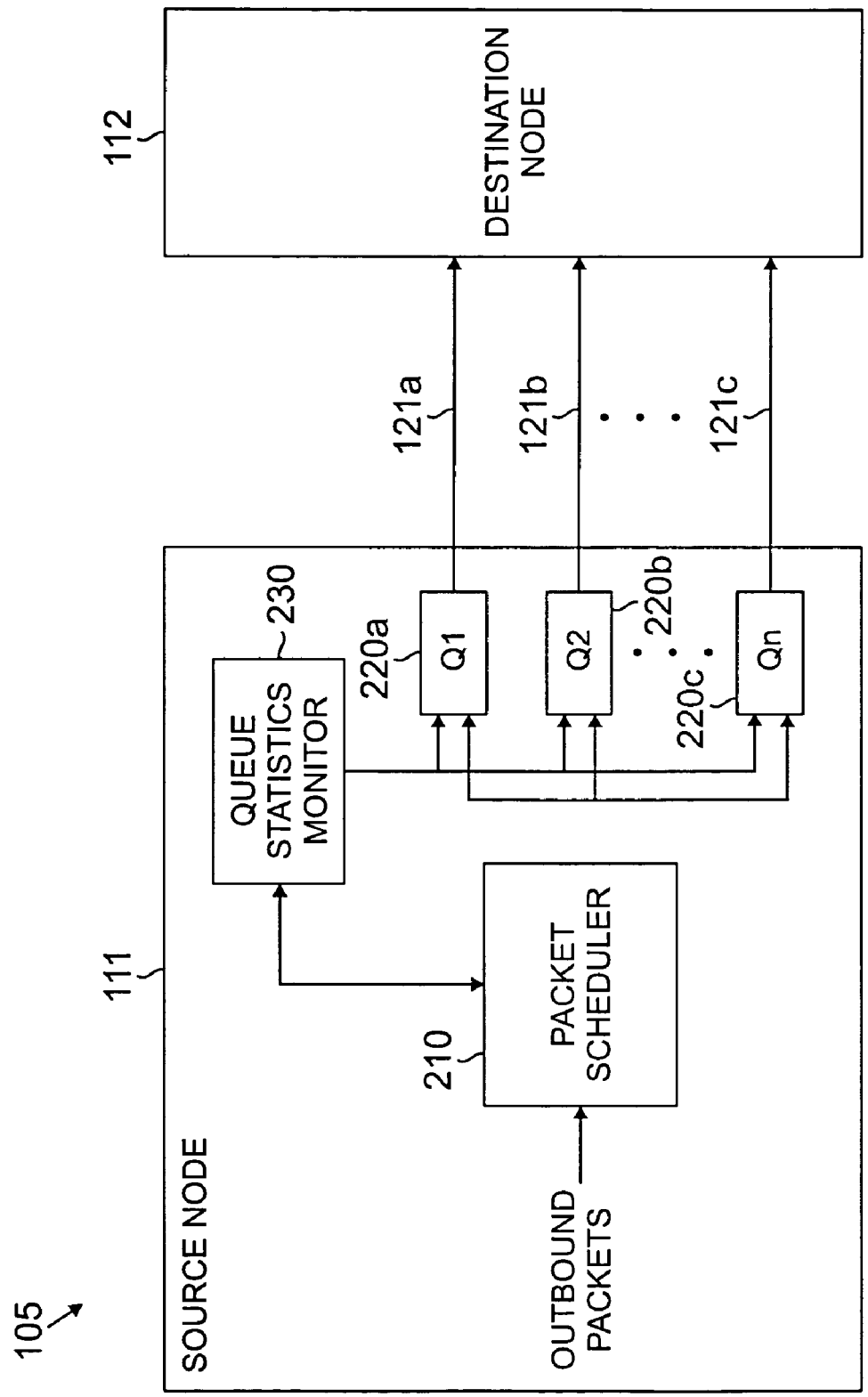
FIG. 2 illustrates an exemplary data packet processing node in greater detail according to one embodiment of the present invention.
Figure 3:
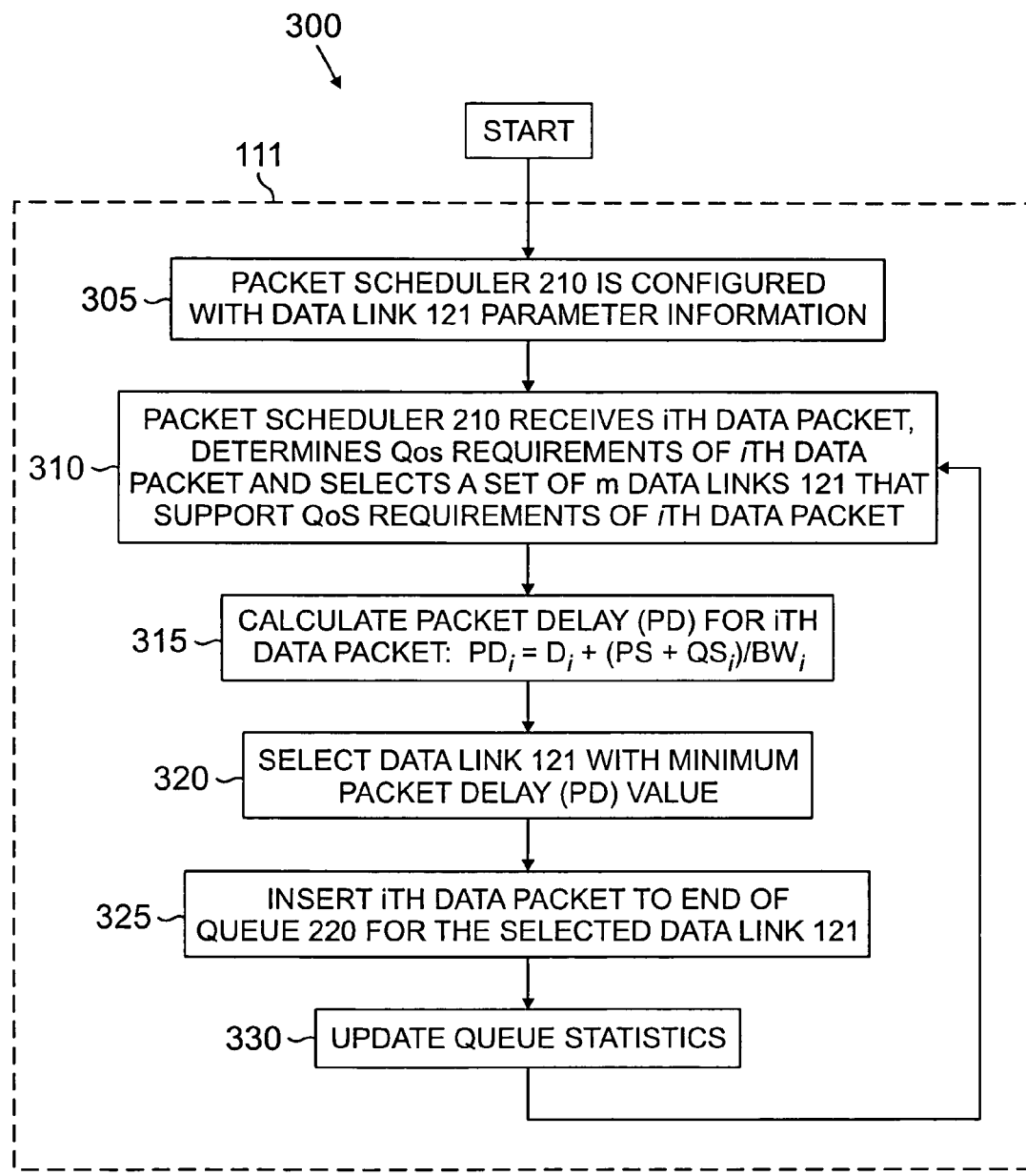
FIG. 3 is a flow diagram illustrating the operation of the exemplary data packet processing node according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged packet switching or routing device.

FIG. 1 illustrates exemplary communication network 100 containing data packet switches 111-114 in accordance with the principles of the present invention. Communication network 100 comprises subnetwork 105 (indicated by a dotted line) that contains data packet switches 111-114, that interconnects end-user devices 131-134 with each other and with other switches (not shown) and other end-user devices (not shown) associated with communication network 100. Data packet switches 111-114 are interconnected by heterogeneous data links 121-126. According to an advantageous embodiment of the present invention, each one of data links 121-126 comprises multiple heterogeneous data links (i.e., multilinks). For example, data link 121 may comprise two or more of: T1 lines, T3 lines, fiber optic lines, and/or wireless links (i.e., RF channels).

Subnetwork 105 is intended to be a representative portion of communication network 100, which may contain many other switches similar to data packet switches 111-114. Communication network 100 may also comprise wireless equipment, such as a base station, that enables communication network 100 to communicate with wireless devices, such as cellular telephones and/or computers equipped with cellular modems.

In accordance with the principles of the present invention, each of data packet switches 111-114 comprises a packet scheduler that schedules the transmission of data packets over the multiple heterogeneous data links coupled to each data packet switch. The packet scheduler in a source node (or transmitting node) receives data packets from some network data packet generator (e.g., one of user devices 131-134) and schedules each data packet to be transmitted over one of the data links—coupling the source node to the destination node (or receiving node). However, the packet scheduler is not constrained to use the same type of data link for data packets received from the same data packet generator. Thus, the packet scheduler may select different types of links for different data packets from the same data packet generator.

FIG. 2 illustrates exemplary data packet switch 111 in greater detail according to one embodiment of the present invention. In the illustrated example, data packet switch 111 (labeled "source node") is receiving outbound data packets from a data packet generator (e.g., end-user device 131). Data packet switch 111 then schedules and transmits the data packets to data packet switch 112 (labeled "destination node"). The data packets are transmitted between the source node and the destination node by up to N heterogeneous data links 121, including exemplary data links 121*a*, 121*b* and 121*c*.

Data packet switch 111 (i.e., source node 111) comprises packet scheduler 210, and N packet queues 220, including exemplary packet queue (Q) 220*a*, 220*b*, and 220*c*. According to an exemplary embodiment of the present invention, packet queues 220 comprise data buffers capable of holding (queuing) data packets that are to be transmitted across data links 121. Data packet switch 111 also comprises queue statistics monitor 230, which monitors selected statistics about each packet queue. These statistics may include the number of queued data packets in each packet queue 220, the queued data packet sizes, or the like. According to an alternate embodiment, queue statistics monitor 230 may not be a separate device from packet scheduler 210. Instead, queue statistics monitor 230 may be integrated into the packet processing circuitry of packet scheduler 210, or into packet queues 220 themselves.

During routine operation, data packets enter data packet switch 111 (i.e., source node 111) and are sent to data packet switch 112 (i.e., destination node 112) over the N data links 121 at varying speeds. It is assumed that the aggregate bandwidth of the N data links 121 is greater than, or equal to, the sustained traffic rate from source node 111 and destination node 112. The present invention is capable of supporting switching systems that have output queuing, but no input queuing.

According to an exemplary embodiment of the present invention, packet scheduler 210 may be embodied as a controller (or packet processor) comprising a data processor and a memory for storing instructions executable by the data processor. The present invention implements an algorithm that is executed by packet scheduler 210 in data packet switch 111 (i.e., the source node). For each incoming data packet, the novel algorithm selects an optimal outgoing data link among the multiple data links 121a, 121b, 121c, and so forth. During routine operation, packet scheduler 210 is configured with the following operating parameters about each data link 121 at startup: 1) state of the link (e.g., available or not available for packet queuing); 2) quality of service (QoS) types supported by the link; 3) link bandwidth (BW) partitioned by QoS types; and 4) link propagation delay (D).

Packet scheduler 210 may be configured with these link parameters by any conventional means, including, for example, a management interface (e.g., SNMP, CLI, etc.) or a link discovery protocol. The total delay incurred by a packet in reaching the destination is the sum of: 1) queuing delay at the output queue; 2) transmission delay for sending the complete packet; and 3) the propagation delay of the selected data link 121. The algorithm of the present invention selects a link such that the delay incurred is for each data packet is minimal. Such a selection invariably ensures that: 1) the end-to-end delay is the minimum for each packet; 2) the probability of data packet reordering is minimal; and 3) no additional buffering is required at the destination node for packet reordering.

FIG. 3 depicts flow diagram 300, which illustrates the operation of exemplary data packet processing node 111 according to one embodiment of the present invention. As noted above, packet scheduler 210 is initially configured with operating parameters about each data link 121 at startup (process step 305). For each new outgoing data packet that packet scheduler 210 receives, packet scheduler 210 determines the QoS requirement of the packet and selects a suitable set of data links 121 that can support the QoS requirements (process step 310). Next, packet scheduler 210 computes the packet delay (PD) factor for each selected data link 121 using the equation:

$$PD_i = D_i + (PS + QS_i)/BW_i,$$

where
- $PD_i$ is the packet delay for the ith data link 121;
- $D_i$ is the link propagation delay of the ith data link 121;
- PS is the packet size;
- $QS_i$ is the queue size of the ith data link 121; and
- $BW_i$ is the bandwidth of the ith data link 121 (process step 315).

Once the packet delay (PD) is known for each data link 121, packet scheduler 210 selects the data link 121 with the minimum packet delay (process step 320). Next, packet scheduler 210 inserts the data packet to the end of the output queue 220 associated with the selected data link 121 (process step 325). Next, queue statistics monitor 230 updates the statistics for all packet queues 220 (process step 330).

Queue statistics monitor 230 reads the current queue size for each of packet queues 220. The complexity of the present invention increases with the number of data link 220 supported. The calculation above may be done in software in packet scheduler 210 for a limited number of links on a per packet basis. In alternate embodiments, hardware-based implementations may be used for high packet rate requirements.

One important goal of the algorithm is to minimize the packet-reordering problem at destination node 112. Simulations have shown that link utilization reaches 100% if there are enough data packets to fill in the entire bandwidth. This type of packet queuing can be useful specifically for delay and jitter sensitive applications like voice over IP. This mechanism also supports the QoS requirements for applications by choosing a set of links that can meet the requirements.

The most common prior art methods of load balancing assume the links to be homogeneous in nature and balancing of the bandwidth (i.e., optimizing the link utilization) is the main concern. Methods based on bandwidth optimization need a large and indefinite amount of buffering at the destination node in order to deliver the packets in sequence. This attribute makes support of real-time and delay-sensitive applications across heterogeneous links difficult, if not impossible, due to the introduction of indefinite latency and the resultant jitter.

The proposed mechanism is suitable for implementation in any real-time system. It is protocol independent and scales well for a large number of heterogeneous links with different delay and bandwidth properties. It can be adopted in network devices supporting multi-link PPP and frame relay over WAN links.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a first packet switching device capable of transmitting outgoing data packets to a second packet switching device over N parallel heterogeneous data links, said first packet switching device comprising N packet queues for storing the outgoing data packets prior to transmission over said N parallel heterogeneous data links, an apparatus for selecting one of said N parallel heterogeneous data links for transmitting the outgoing data packets comprising:
   a controller configured to select one of said N parallel heterogeneous data links to transmit each outgoing data packet, said controller configured to, for each outgoing data packet:
      determine a quality of service (QoS) requirement associated with each outgoing data packet;
      select a subset S of said N parallel heterogeneous data links, wherein S is greater than one and less than N and said subset S is selected according to said QoS requirement associated with each outgoing data packet;
      calculate a packet delay value for each one of said subset S of said N parallel heterogeneous data links, wherein said packet delay (PD) value for each of said S parallel heterogeneous data links is determined as a function of i) a propagation delay (D) of said each heterogeneous data link; ii) a packet size (PS) of each outgoing data packet; iii) a queue size (QS) of a packet queue associated with said each heterogeneous data link; and iv) a bandwidth (BW) of said each heterogeneous data link, and
      determine one of the subset S parallel heterogeneous data links that will result in minimization of packet-reordering at the destination for each outgoing data packet, wherein the determination is made prior to transmitting the data packet and minimizes the probability that packet-reordering will be required.

2. The apparatus as set forth in claim 1 wherein said packet delay value for said each of said S parallel heterogeneous data links is given by the equation:

$$PD = D + (PS + QS)/BW.$$

3. The apparatus as set forth in claim 2 wherein said controller selects one of said S parallel heterogeneous data links having a minimum packet delay value to transmit each outgoing data packet.

4. The apparatus as set forth in claim 3 further comprising a queue statistics monitor configured to monitor queue sizes of said N packet queues.

5. The apparatus as set forth in claim 4 wherein said controller adds each outgoing data packet to a corresponding one of said packet queues associated with said selected data link having said minimum packet delay value.

6. The apparatus as set forth in claim 5 wherein said queue statistics monitor updates said queue sizes of said N packet queues after said controller adds each outgoing data packet to said corresponding one of said packet queues associated with said selected data link.

7. The apparatus as set forth in claim 6 wherein said queue statistics monitor updates said queue sizes before said controller calculates new packet delay values associated with a transmission of a second outgoing data packet following each outgoing data packet.

8. A first packet switching device capable of transmitting outgoing data packets to a second packet switching device over N parallel heterogeneous data links, said first packet switching device comprising:

N packet queues configured to store the outgoing data packets prior to transmission over said N parallel heterogeneous data links; and a controller configured to select one of said N parallel heterogeneous data links to transmit each outgoing data packet, said controller configured to, for each outgoing data packet:

determine a quality of service (QoS) requirement associated with each outgoing data packet;

select a subset S of said N parallel heterogeneous data links, wherein S is greater than one and less than N and said subset is selected according to said QoS requirement associated with each outgoing data packet;

calculate a packet delay value for each one of said subset S of said N parallel heterogeneous data links, wherein said packet delay (PD) value for said each of said S parallel heterogeneous data links is deteimined as a function of i) a propagation delay (D) of said each heterogeneous data link; ii) a packet size (PS) of each outgoing data packet; iii) a queue size (QS) of a packet queue associated with said each heterogeneous data link; and iv) a bandwidth (BW) of said each heterogeneous data link, and determine one of the subset S parallel heterogeneous data links that will result in minimization of packet-reordering at the destination for each outgoing data packet, wherein the determination is made prior to transmitting the data packet and minimizes the probability that packet-reordering will be required.

9. The first packet switching device as set forth in claim 8 wherein said packet delay value for said each of said S parallel heterogeneous data links is given by the equation:

$$PD=D+(PS+QS)/BW.$$

10. The first packet switching device as set forth in claim 9 wherein said controller selects one of said S parallel heterogeneous data links having a minimum packet delay value to transmit each outgoing data packet.

11. The first packet switching device as set forth in claim 10 further comprising a queue statistics monitor configured to monitor queue sizes of said N packet queues.

12. The first packet switching device as set forth in claim 11 wherein said controller adds each outgoing data packet to a corresponding one of said packet queues associated with said selected data link having said minimum packet delay value.

13. The first packet switching device as set forth in claim 12 wherein said queue statistics monitor updates said queue sizes of said N packet queues after said controller adds each outgoing data packet to said corresponding one of said packet queues associated with said selected data link.

14. The first packet switching device as set forth in claim 13 wherein said queue statistics monitor updates said queue sizes before said controller calculates new packet delay values associated with a transmission of a second outgoing data packet following each outgoing data packet.

15. For use in a first packet switching device capable of transmitting outgoing data packets to a second packet switching device over N parallel heterogeneous data links, wherein the first packet switching device comprises N packet queues for storing outgoing data packets prior to transmission over the N parallel heterogeneous data links, a method for selecting one of the N parallel heterogeneous data links to transmit each outgoing data packet comprising the steps of, for each outgoing data packet:

determining a quality of service (QoS) requirement associated with each outgoing data packet;

selecting a subset S of the N parallel heterogeneous data links, wherein S is greater than one and less than N and the subset is selected according to the QoS requirement associated with each outgoing data packet; and calculating a packet delay value for each one of the subset S of the N parallel heterogeneous data links, wherein the packet delay (PD) value for each one of the S parallel heterogeneous data links is determined as a function of i) a propagation delay (D) of each heterogeneous data link; ii) a packet size (PS) of each outgoing data packet; iii) a queue size (QS) of a packet queue associated with each heterogeneous data link; and iv) a bandwidth (BW) of each heterogeneous data link; and determining one of the subset S parallel heterogeneous data links for transmission that will result in minimum packet reordering at the destination for each outgoing data packet, wherein the determination is made prior to transmitting the data packet and minimizes the probability that packet-reordering will be required.

16. The method as set forth in claim 15 wherein the packet delay value for each of the S parallel heterogeneous data links is given by the equation:

$$PD=D+(PS+QS)/BW.$$

17. The method as set forth in claim 16 further comprising the step of monitoring queue sizes of the N packet queues.

18. The method as set forth in claim 17 further comprising the step of adding each outgoing data packet to a corresponding one of the packet queues associated with the selected data link having the minimum packet delay value.

19. The method as set forth in claim 18 further comprising the step of updating the queue sizes of the N packet queues after the step of adding each outgoing data packet to the corresponding one of the packet queues associated with the selected data link.

20. The method as set forth in claim 19 further comprising the step of updating the queue sizes before calculating new packet delay values associated with a transmission of a second outgoing data packet following each outgoing data packet.

* * * * *